(12) United States Patent
Edwards et al.

(10) Patent No.: US 6,275,486 B1
(45) Date of Patent: Aug. 14, 2001

(54) ADAPTIVE RESOURCE ALLOCATION SCHEME FOR A FIXED WIRELESS ACCESS COMMUNICATIONS SYSTEM

(75) Inventors: Keith Russell Edwards, Paignton; Alister Graham Burr, York; Timothy Conrad Tozer, Elvington; David Andrew James Pearce, York, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/789,861

(22) Filed: Jan. 28, 1997

(30) Foreign Application Priority Data

Oct. 12, 1996 (GB) .................................................. 9621332

(51) Int. Cl.[7] ...................................................... H04J 3/16
(52) U.S. Cl. ............................................................. 370/347
(58) Field of Search .................................... 370/347, 389, 370/395, 445, 452, 335, 342, 252, 441, 468, 479, 447, 449, 450, 457, 458, 459, 460, 461, 254, 241, 255, 442, 522, 524, 465, 247, 280, 282, 294, 337, 320, 319, 480, 344, 224, 501, 384, 430, 225, 239, 353, 354

(56) References Cited

U.S. PATENT DOCUMENTS 5,276,703 * 1/1994 Budin et al. .......................... 370/445
5,734,646 * 3/1998 I et al. .................................. 370/441

* cited by examiner

*Primary Examiner*—Dang Ton
(74) *Attorney, Agent, or Firm*—Lee, Mann, Smith, McWilliams, Sweeney & Ohlson

(57) ABSTRACT

This invention relates to radio communication networks and more particularly, but not exclusively, to radio communication networks using multiple access techniques. A system and method for adaptively changing the characteristics of a signal transmitted across a network is provided. In one embodiment, the communications network comprises at least two stations for transmitting and receiving; wherein at least one of the stations is capable of sending a control signal to the other station after receiving a signal transmitted over the network from the other station after analysis of the transmitted signal, which control signal is transmitted as a data packet independent of the other data and overhead signals.

9 Claims, 4 Drawing Sheets

CONTENTION SLOT
ALLOCATION
PROCEDURE

ADAPTIVE RESOURCE ALLOCATION SCHEME FOR A FIXED WIRELESS ACCESS COMMUNICATIONS SYSTEM

TECHNICAL FIELD

This invention relates to radio communication networks and more particularly, but not exclusively, to radio communication networks using multiple access techniques.

BACKGROUND TO THE INVENTION

In radio communications systems such as GSM digital mobile radio protocol, the communications channel hops from one frequency band to another according to a specified routine. The system overcomes the effects of fading, scattering and other transmission problems on a particular channel by swapping channels and providing an average of the signal strength of the channels available, which will provide a sufficient signal. Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions.

A receiver moving through this spatially varying field experiences a fading rate which is proportional to its speed and the frequency of the transmission. Since the various components arrive from different directions, there is also a Doppler spread in the received spectrum. If the channel allocation was static, then as the subscriber, for example, moved to an urban environment where signal reflections affected the particular frequency in which the channel was operating more than other frequencies, then the channel which was previously best then becomes poor. In fact such movement may produce a break in communications.

In fixed radio applications, the problems of fading still exist but are not so rapid; in a fixed system, the best channel would be likely to stay the best signal for a period of time. Frequently, the fading follows a Rayleigh distribution.

In radio communications, signals are transmitted at a particular frequency or in a frequency band. The signals may be modulated in a variety of fashions using techniques such as Time Division Multiple Access (TDMA), Frequency Division Multiple Access (FDMA), and a multitude of other techniques. Nevertheless there are a finite number of available individual communications channels for separate sets of parties to communicate with each other.

A radio communications system of the TDMA-TDD type is designed so that a multiple frame is made up of a plurality of frames each divided into a plurality of time slots; each base station selects an idle time slot of a multiple frame for transmission of the control-channel signal to send control-channel information to the associated receiver at intervals of a multiple frame period. FIG. 1 is a timing chart showing the relationship of the transmission and reception of signals between an base station (BS) and an outstation (OS).

In FIG. 1, a block of up-link signal time slots and a block of down-link signal time slots have four slots respectively. The time slots of each frame are divided into a block of down-link signal (for communication from the base station to the out station) slots 10 (down-link signal slot block 10) and a block of up-link signal (for communication from the out station to the base station) slots 20 (up-link signal slot block 20), and the aforementioned slot for transmission of the control-channel signal directed to the out station (which slot will be referred to as the down-link control-channel slot, hereinafter) is selected from the down-link signal slots of the block of a frame (for example, a time slot 4 in FIG. 1 is selected).

The transmission of the control-channel signal from the mobile station to the base station is carried out at one (which will be referred to as the up-link signal slots of each frame having a corresponding positional relationship with the above down-link control-channel slot. e.g., located as shifted by a half frame from the down-link control-channel slot. For example, when the time slot 4 in FIG. 1 is used as the down-link control-channel signal slot, a time slot 8 shifted by a half frame from the time slot 4 is used as the up-link control-channel slot. The remaining slots (time slots 1, 2, 3, 5, 6 and 7 in FIG. 1) of the up and down-link signal slot blocks of each frame other than the up and down-link control-channel signal slots are used as slots for communication of data information between the base station and out station.

Each base station transmits the control-channel signal at intervals of the multiple frame period with use of a signal carrier of an identical frequency commonly used by the other base stations and also with use of the down-link control-channel slot of the specific frame selected by its own base station. With respect to the frames of each multiple frame other than the specific frame, ones of the down-link signal slots located to correspond to the down-link signal slots located to correspond to the down-link control-channel slot, e.g. located as shifted by one frame are not effectively used. Each base station assigns specific up-and down-link traffic-channel slots of each frame to each of the out stations under the jurisdiction of the base station and assigns a frequency to one selected from a plurality of predetermined channels. Accordingly, each out station communicates with the base station and another out station via the base station at intervals of each of the frames of the multiple frame with use of the traffic channel slots specified by the base station.

A disadvantage of employing such schemes, however, is that the numbers of time slots for actual transmission of data are reduced by the presence of these control-channel slots which represent large overheads, and inevitably reduce system capacity. These control-channel slot overheads detract from the gains in efficiency achieved by the use of adaptive techniques. Where such training sequences are employed over an asymmetrical channel only an approximation of the forward channel characteristics can be determined, further reducing the optimisation that can be achieved.

Where training sequences have not been employed, systems have tended to rely on each transmitter analysing the characteristics of received signals transmitted from the other end of the circuit. However during data transmission, the majority of information tends to flow in one direction, e.g. during transmission of a large data file. Where transmission time is long, the channel conditions may change sufficiently that the characteristics of the transmitted signal are no longer optimal. However, as the majority of information flows in one direction only, the transmitter does not receive information relating to required changes in signal characteristics.

OBJECT OF THE INVENTION

Accordingly the present invention seeks to ameliorate the above disadvantages.

SUMMARY OF INVENTION

According to a first aspect of the present invention, there is provided a communications network including at least two stations for transmitting and receiving; wherein at least one of the stations is capable of sending a control signal to the other station after receiving a signal transmitted over said network from said other station after analysis of the transmitted signal, which control signal is transmitted as a data packet independent of the other data and overhead signals. The data packet is transmitted independently of the rate and type of the other data and overhead signals, although could take, for example a data slot normally reserved for a TDMA transmission. The control signal could also be transmitted as an overhead on an infrequent basis. In this fashion, the control signal is transmitted by way of a data packet whereby no specific system overheads are required, thereby providing increased system capacity.

According to a further aspect of the present invention, there is provided a method of communicating over a communications network including at least two stations; said method comprising the steps of:

1) transmitting a signal from a first station of the communications network to a second station of the communications network;
2) receiving at the second station a signal transmitted over said circuit by said first station;
3) analysing the transmission characteristics of said transmitted signal;
4) transmitting a control signal independent of other data and overhead signals to said first station.

According to a still further aspect of the present invention, there is provided a method of communicating over a communications network including at least two stations; said method comprising the steps of:

1) transmitting a signal from a first station of the communications network to a second station of the communications network;
2) receiving at the second station a signal transmitted over said circuit by a transmitting end;
3) analysing the transmission characteristics of said transmitted signal;
4) determining whether the signal characteristics need to be varied and;
5) in the case that the signal characteristics need to be varied transmitting a control signal as a feedback signal independent of other data and overhead signals to the first station in response to said analysis of said received signal characteristics.

Preferably, the feedback signal is provided as a data packet, which can be, for example, a slot in a multiple access system. The feedback signal can be transmitted as a random access slot. The feedback signal can advise the transmitter to reduce or increase signal power, change modulation scheme, frequency or other types of signal parameters. The communications system can be a radio communications system, but can find applicability in other communications systems employing other signalling media. The invention is particularly suited to situations where slow temporal fading is present as the main form of fading such as a fixed radio access telecommunications environment: the fading should not be faster than the adaptation time constant associated with the system.

The present invention also has application in other systems where overall system performance depends upon the optimisation of signal parameters.

BRIEF DESCRIPTION OF THE DRAWINGS

The invention will now be described with reference to the accompanying drawings, wherein.

DESCRIPTION OF THE PREFERRED EMBODIMENT

Figure 1:
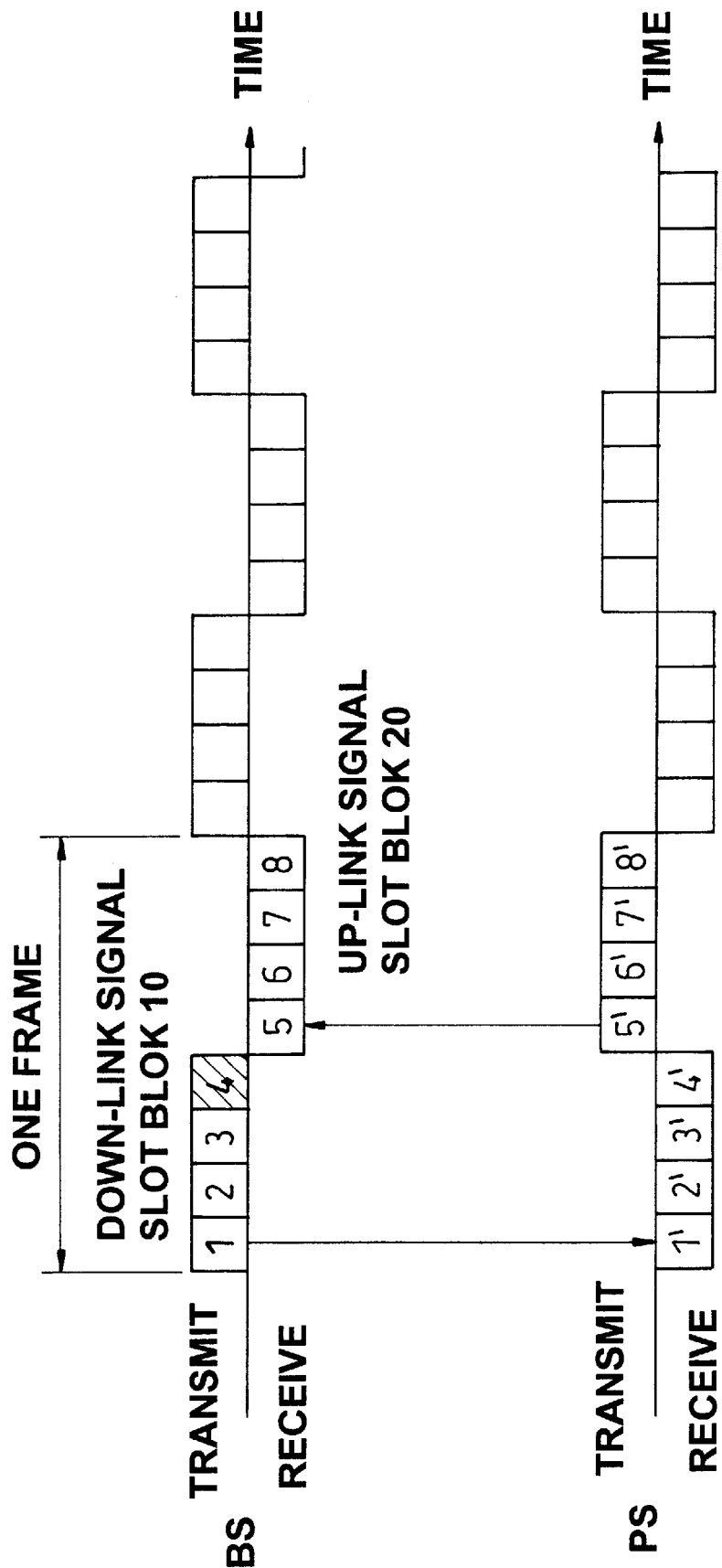
FIG. 1 is details a TDMA structure.
Figure 2:
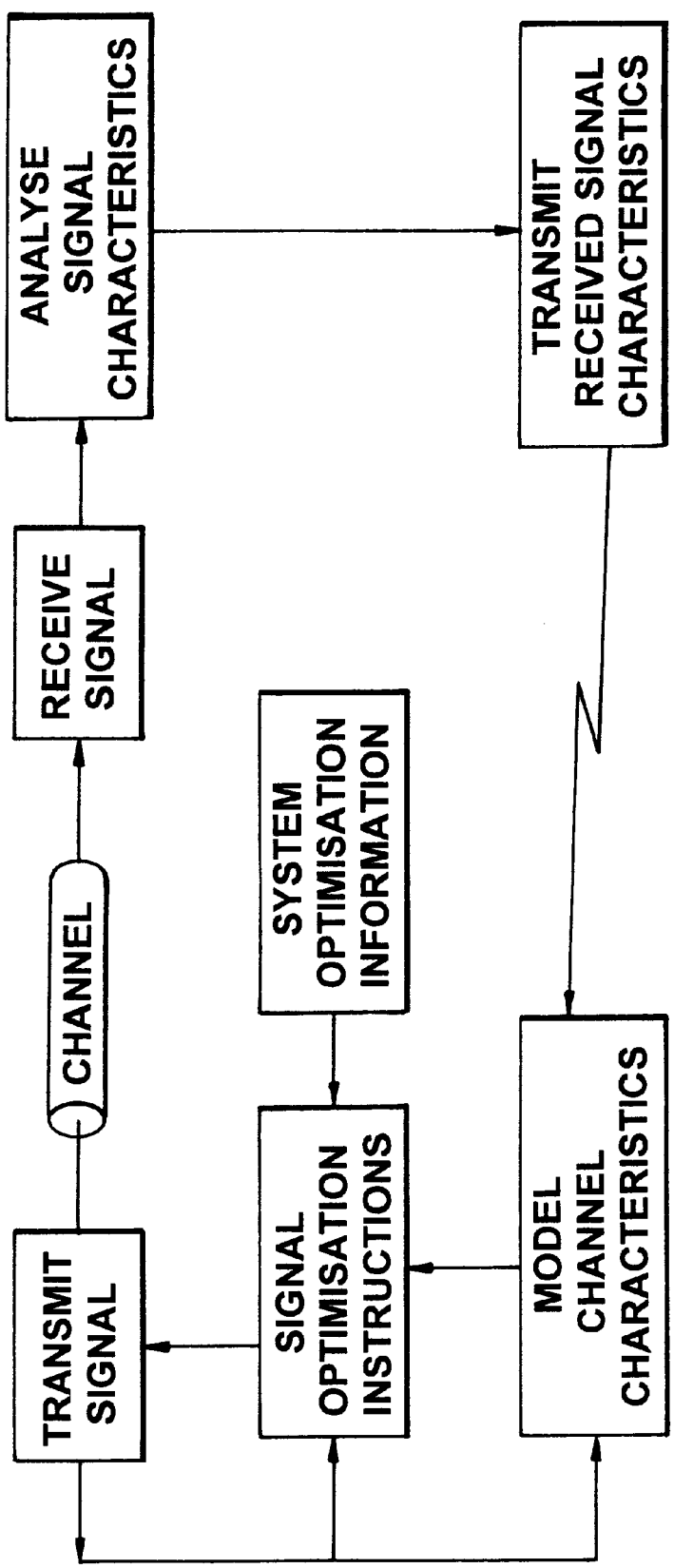
FIG. 2 is a block diagram of a first embodiment.

Referring now to FIG. 2, there is shown a block diagram of one particular system mode in accordance with the present invention. In the system described, a voice/data signal (herein after referred to as the signal) is transmitted across a channel where it is received by a receiving end of the circuit.

At the receiving end the transmitted signal, the signal is analysed to determine the transmission characteristics of the signal. Parameters such as attenuation, noise interference levels etc. are be assessed.

One of the stations is capable of sending a control signal to the other station after receiving a signal transmitted over said network from said other station after analysis of the transmitted signal, which control signal is transmitted as a data packet independent of the other data and overhead signals. The data packet is transmitted independently of the rate and type of the other data and overhead signals, although could take, for example a data slot normally reserved for a TDMA transmission. The control signal could also be transmitted as an overhead on an infrequent basis. In this fashion, the control signal is transmitted by way of a data packet whereby no specific system overheads are required, thereby providing increased system capacity. If it is determined that the signal quality is varying outside an acceptable boundary or beyond an acceptable threshold, then a feedback signal should be transmitted back to the transmitter on another channel/bearer, to be transmitted according to another modulation scheme and then communicated to the transmitting end of the circuit. The parameters are communicated via the transmit path of the receiving end of the circuit.

The control signal may not require the system to change. Alternatively, it may be necessary for the system to change, in which case the transmitting end of the circuit will receive the feedback signal and then adapt the characteristics of the transmit path. An alternative embodiment could optimise the parameters of the transmit signal based on the characteristics of a uniform feedback signal alone. To analyse the signals, standard signal analysis techniques can be used to derive signal characteristics.

The feedback signal can be transmitted by way of a data packet whereby no specific system overheads, such as training sequences and the like are required. This contrasts with the techniques used, for example, in GSM, where a dedicated portion of each data packet is allocated to signal administration functions. This simplifies the signalling and increases the system capacity. In another embodiment, the feedback packets could be transmitted on a contention basis with a reduced overhead scheme.

It is preferred that a channel model, capable of adapting from past signal attenuation be implemented. By way of example, it could appear from received signal parameters that transmit power could be optimally reduced. However, the transmit path model may have learnt that reducing power will increase system errors due to fading or interference.

The use of network/system optimisation information and/or commands can be used to assist with determining whether trade offs between signal parameters can achieve acceptable/ optimal network/system performance. For example, in an emergency situation or an unusually high demand time, the network may determine that minimum call blocking rate has preference over voice quality. Accordingly, signal characteristics may be adapted in response to this command. Alternatively, the network/system may give priority to users with poor channel characteristics to ensure that system quality is substantially uniform for all users.

Figure 3:
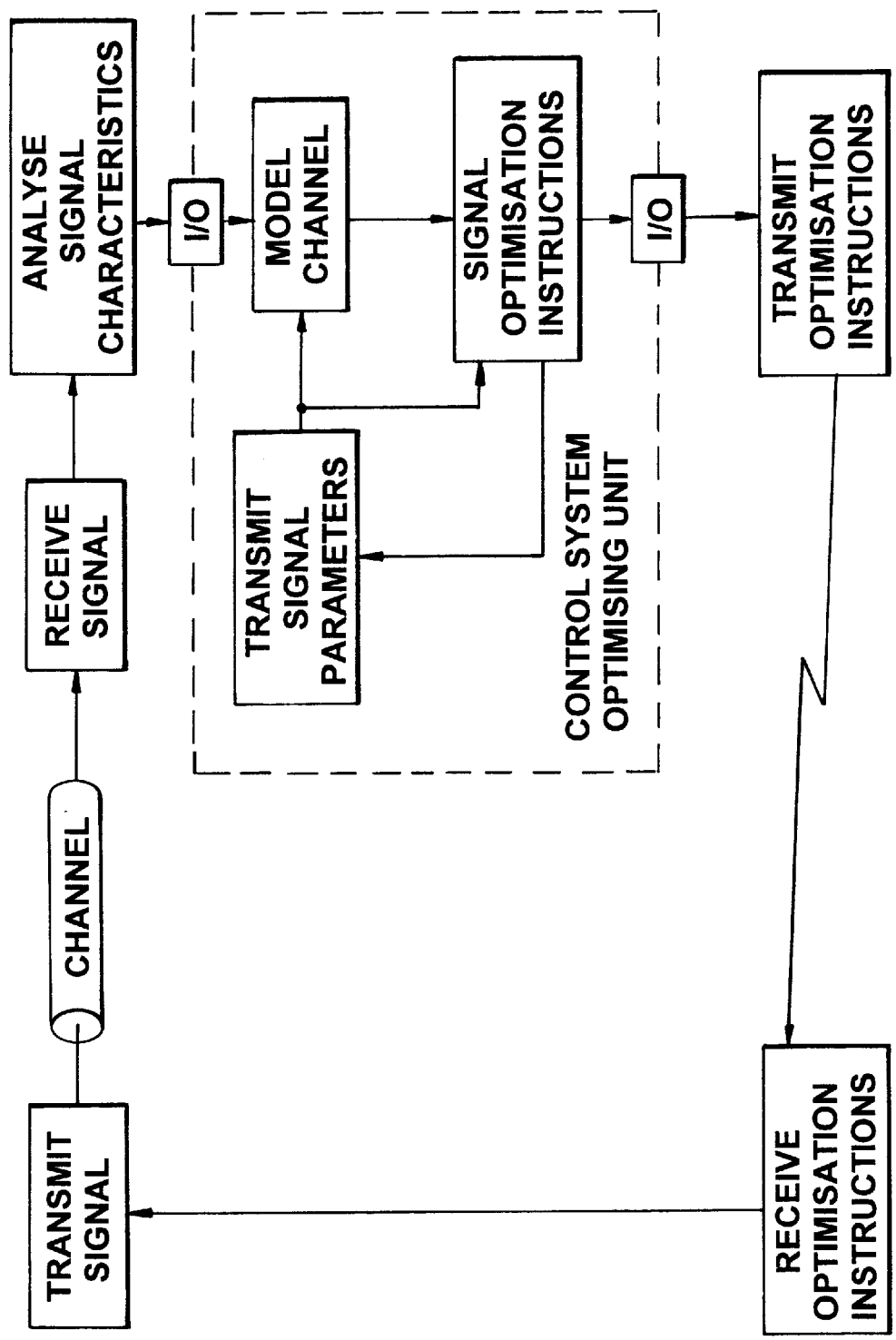
FIG. 3 is a block diagram of a radio frequency access system embodiment.

FIG. 3 is a block diagram of a network employing multiple access techniques typically a radio frequency multiple access system. The diagram assumes that the out station which could be a mobile unit (MU) or a residential subscriber unit (RSS) is transmitting to a base station. Signal analysis, however, could be carried out in a residential subscriber unit or mobile unit but this could increase outstation unit cases. The out station could also provide the base station with transmit signal optimisation instructions. The implementation of such a system being similar in principle to at least one of the embodiments described below or represented in FIG. 3.

The embodiment detailed in FIG. 3 functions in a similar fashion to the system of FIG. 2; signals are transmitted over a channel from an out station to a base station. The base station receives the transmitted signal and analyses its signal characteristics. The signal characteristics are then passed to a central modelling unit which is common to the channels supported by the base station. This central unit is adapted to generate optimisation instructions for each of the transmitters.

Signal characteristics can be agreed upon by both parties during call set up. These parameters are stored in a transmitted signal parameters memory detailed in FIG. 3. Where default signal characteristics are used, these characteristics are similarly stored. During a signal optimisation procedure, the system may have reference to these signal characteristics when generating optimising instructions. It is preferred that this store be updated with optimised characteristics when optimisation instructions are issued to the transmitter. By retaining and updating a central store of transmitted signal characteristics, the system reduces the need to perform channel modelling and signal optimisation routines.

Figure 4:
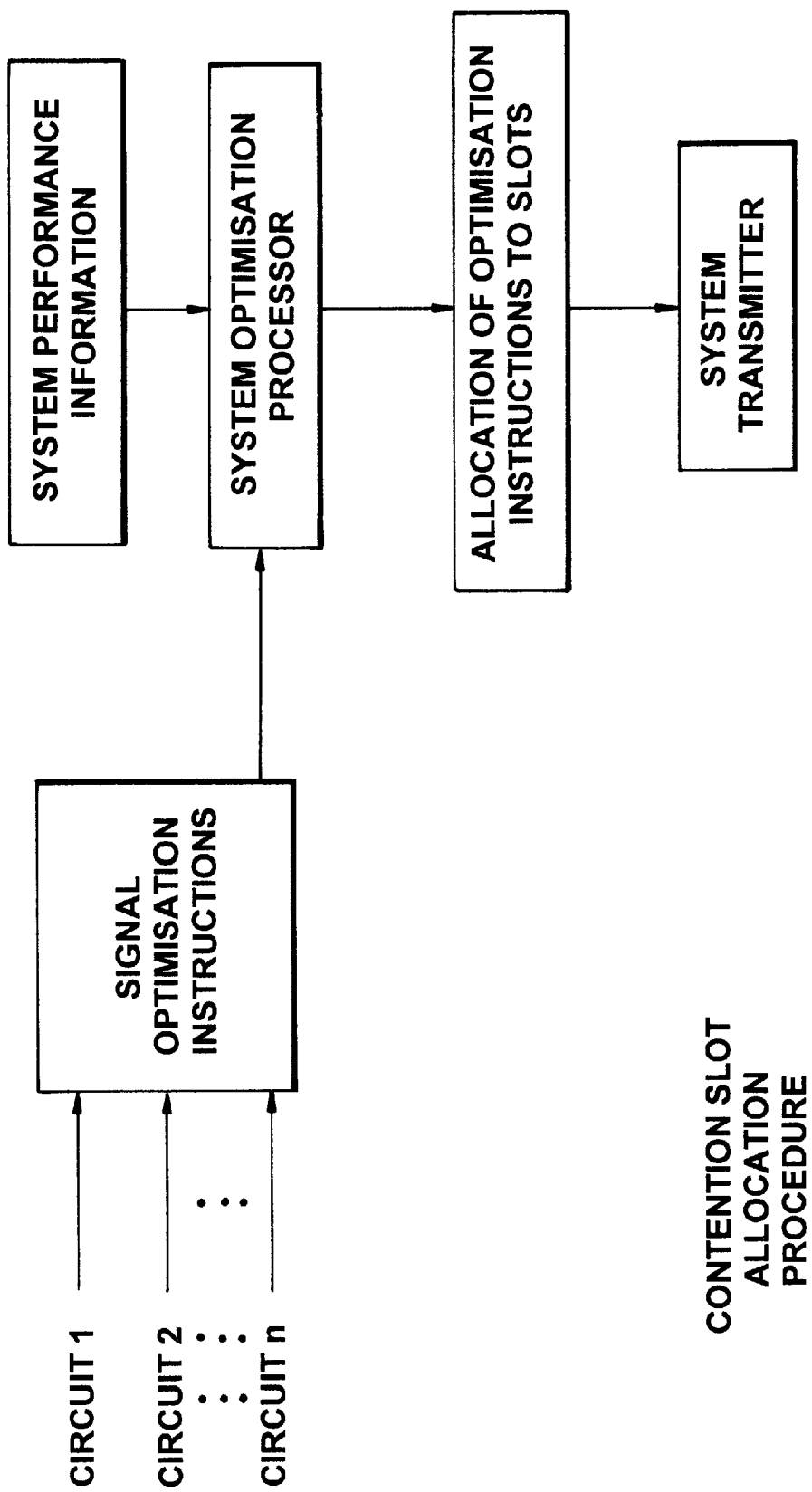
FIG. 4 is a block diagram relating to the allocation of optimisation information to slots on a multiple access frame.

FIG. 4 is a block diagram for a multiple access system. In some systems, particularly those with slow fading characteristics, optimisation of each transmitter may not occur with every frame. In such a system signalling overhead can be further reduced by allocating a limited number of slots per frame (less than the number of transmitters that require optimisation) to optimisation signalling.

Allocation of circuit instructions to particular frames could follow a number of methods according to the systems priorities with regard to optimisation. For example, a system may be aiming to achieve maximum data throughput during a period of heavy data use. It may be desirable to modify the encoding algorithms used to achieve this. In this case, the system may allocate optimisation slots on successive frames in order of heaviest user to lightest user. Alternatively, high system quality may be preferred. In such an instance, optimisation slots on successive frames may be allocated to those circuits with highest quality transmission before improvements in poor quality signals may be effected. Other types of allocation techniques could be used. For example, a circuit may request to transmit optimisation information only when it is determined that the transmitted signal falls outside optimum signal parameters. In such an instance, the optimisation information may be allocated to contention slot transmission.

What is claimed is:

1. A method of communicating a control signal over a wireless communications network, comprising the steps of:

transmitting on a channel/bearer of said network a signal from a first station of the network to a second station of said network;

at said second station, receiving said signal transmitted by the first station;

at said second station, analysing the signal received from said first station to determine at least one received signal transmission characteristic;

transmitting from said second station to said first station a control signal conveying information relating to said at least one received signal transmission characteristic, said control signal being transmitted on a different channel/bearer as a data packet independent of network overhead signals; and following analysis of the received signal, determining whether the at least one transmission characteristic needs to be varied and, where it is determined that said at least one transmission characteristic does not need to be varied, not transmitting the control signal to the first station.

2. A method as claimed in claim 1, wherein the control signal comprises transmit optimisation instructions for the first station.

3. A method as claimed in claim 1, wherein the at least one transmission characteristic comprises one of received signal power, modulation scheme and frequency.

4. A method as claimed in claim 1, wherein the control signal informs the first station to vary one of signal power, modulation scheme and frequency.

5. A wireless communications network comprising:

a first station for transmitting on a channel/bearer of said network a communications signal;

a second station for receiving said signal transmitted by said first station, said second station including a signal analyser for analysing said received signal to determine at least one received signal characteristic;

a transmitter for transmitting from said second station to said first station a control signal conveying information relating to said at least one received signal transmission characteristic, said control signal being transmitted on a different channel/bearer as a data packet independent of network overhead signals, wherein following analysis of the received signal, the signal analyser determines whether the at least one transmission characteristic needs to be varied and, where it determines that said at least one transmission characteristic does not need to be varied, it prevents transmission of the control signal to the first station.

6. A wireless communications network as claimed in claim 5, wherein the first station includes system optimisation means for processing said control signal from the second station and in response thereto varying at least one signal transmission characteristic of a signal to be transmitted from said first station.

7. A wireless communications network as claimed in claim 5, wherein said second station includes system optimisation means which receives an input from the signal analyser and outputs the control signal to the first station, said control signal including signal optimisation instructions for the first station.

8. A receiving station for a wireless communications network including:
a receiver for receiving a communications signal;
a signal analyser for analysing a received signal and determining at least one received signal characteristic;
a transmitter for transmitting to a station from which the communications signal was received a control signal conveying information relating to said at least one received signal characteristic, said control signal being transmitted on a different channel/bearer as a data packet independent of network overhead signals, wherein following analysis of the received signal, the signal analyser determines whether the at least one transmission characteristic needs to be varied, it prevents transmission of the control signal to the station from which the communications signal was received.

9. A receiving station as claimed in claim 8, wherein it includes a system optimisation means which receives an input from the signal analyser and outputs the control signal, the control signal including signal optimisation instructions for the station from which the communications signal was received.

* * * * *